United States Patent [19]
Martel et al.

[11] Patent Number: 5,887,165
[45] Date of Patent: Mar. 23, 1999

[54] DYNAMICALLY RECONFIGURABLE HARDWARE SYSTEM FOR REAL-TIME CONTROL OF PROCESSES

[75] Inventors: Sylvain Martel; Serge R. Lafontaine; Ian W. Hunter, all of Lincoln, Mass.

[73] Assignee: Mirage Technologies, Inc., Newton, Mass.

[21] Appl. No.: 879,923

[22] Filed: Jun. 20, 1997

Related U.S. Application Data

[60] Provisional application No. 60/020,249, Jun. 21, 1996.

[51] Int. Cl.$^6$ ................................................ G06F 13/00
[52] U.S. Cl. .................. 395/653; 395/830; 395/801.1; 395/200.51; 395/651; 395/652
[58] Field of Search .................................. 395/651, 653, 395/652, 200.51, 830, 801.1

[56] References Cited

U.S. PATENT DOCUMENTS

| | | | |
|---|---|---|---|
| 4,831,582 | 5/1989 | Miller et al. | 707/104 |
| 5,289,580 | 2/1994 | Latif et al. | 395/275 |
| 5,307,463 | 4/1994 | Hyatt et al. | 395/821 |
| 5,361,373 | 11/1994 | Gilson | 544/354 |
| 5,386,518 | 1/1995 | Reagle et al. | 395/310 |
| 5,479,618 | 12/1995 | Van De Steeg et al. | 364/140.06 |
| 5,535,342 | 7/1996 | Taylor | 395/307 |
| 5,535,406 | 7/1996 | Kolchinsky | 395/800.1 |
| 5,646,544 | 7/1997 | Iadanza | 326/38 |
| 5,671,355 | 9/1997 | Collins | 395/200.2 |
| 5,765,027 | 6/1998 | Wang et al. | 395/860 |

OTHER PUBLICATIONS

Woodward, D.R., et al., "An FPGA based configurable 1/0 System for AC Drive Controllers,"published Oct. 10, 1994, pp. 424–427.

Page, I., "Reconfigurable processor architectures,"Microprocessors and Microsystems, vol. 20, no. 3, May 1, 1996, pp. 185–196.

Lipman, J., "µC Chip program lets you choose Predefined or custom core,"EDN Electrical Design News, vol. 40, no. 16, Aug. 3, 1995, p. 21–22.

Lecurieux–Lafayette G., "Un Seul FPGA Dope Letraitement D'images,"Electronique, no.55, Jan. 1, 1996, pp. 98, 101–103.

Primary Examiner—Christopher B. Shin
Attorney, Agent, or Firm—Loeb & Loeb LLP

[57] ABSTRACT

A dynamically reconfigurable hardware system for real-time control of ,an external device. Configuration of a dynamically reconfigurable logic module is provided on the basis of a hardware configuration established in a local configuration memory by a configuration signal received over a data bus from a host processor, thereby enabling an external device to be controlled in real-time independently of the host processor.

11 Claims, 1 Drawing Sheet

DYNAMICALLY RECONFIGURABLE HARDWARE SYSTEM FOR REAL-TIME CONTROL OF PROCESSES

DESCRIPTION

The present application claims priority from provisional application Ser. No. 60/020,249, filed Jun. 21, 1996, for an invention by the present inventors, of the same title as the present application. This related application is incorporated herein by reference.

1. Technical Field

This invention relates to virtual computing environments utilizing reconfigurable logic modules, such as gate arrays and the real-time control of external devices.

2. Background Art

Although there can be many different implementations of virtual computing devices which make use of field programmable gate arrays ("FPGAs") an example of a prior art version of such system is U.S. Pat. No. 5,497,498. FPGAs are discussed in Villasenor and Mangione-Smith "Configurable Computing", Scientific American, June, 1997, pages 67–71. These references are incorporated herein by reference.

A recent trend in factory automation is to replace dedicated and proprietary computers within the factory with an open architecture control system based on general purpose personal computers (PC). Major control vendors now have business plans at least partially impacted by the PC. Some major control equipment suppliers are already pursuing strategies based entirely on PC control. Towards facilitating the transition from specialized computers to general purpose computers, the Open Modular Architecture for Control (OMAC) specification was developed and adopted by several major corporations.

Maintaining compatibility with the past standards, however, is very important. Consequently, previous attempts to improve control systems while maintaining full compatibility has resulted in relatively minor improvements. Of special note are attempts to replace prior networking schemes for distributing real-time control with methods designed to operate on the general purpose PCs. With the specialized hardware, real-time control was feasible since a dedicated machine had little overhead beyond simply functioning as it was designed to do. That is, network-distributed real-time control requires fast hardware and a fast communications link in order to effectively control devices in real-time. In the prior art, such real-time control was feasible due to the dedicated nature of the equipment. So long as the dedicated system could process the data quickly enough, and perform as designed, then real-time control worked.

When using generic PCs as the controlling computer, it must be assured that the system can still maintain network-distributed real-time control. Current prior art attempts have been unable to manage effective network-distributed real-time control. The reason is that the bandwidth of the physical layer on which the prior art systems rely is too slow due to their relying on communication over the host computer's internal I/O bus.

SUMMARY OF THE INVENTION

The present invention supplies a solution to the need for allowing network-distributed real-time control and also allows the controller to be dynamically reconfigurable in real-time in response to input received from a controlled device that is linked to the controller. Configuration occurs parallel to and in a manner independent of the host computer's processor.

In a preferred embodiment of the invention is provided a dynamically reconfigurable hardware system for real-time control of an external device. The system has a configuration memory, a reconfigurable logic module and a controller, and a communication port. The configuration memory is for storing a hardware configuration of the reconfigurable logic module. The reconfigurable logic module in communication with the configuration memory, establishes the hardware configuration in the module on receipt of a configuration signal. The controller is in communication over a data bus with the reconfigurable logic module, the configuration memory, and sends the configuration signal to the reconfigurable logic module and establishes the hardware configuration in the configuration memory. The communication port, coupled to the reconfigurable logic module independently of signals on the data bus, controls the external device because the communication port is coupled to the reconfigurable logic module, a device may be controlled in real-time in parallel to and in a manner independent of a processor within a host computer. The term "reconfigurable logic module", as used in this description and the following claims, means any digital processing module having a hardware configuration that is field programmable, such as a field programmable gate array (FPGA) or a system programmable gate array (SPGA).

In a further embodiment of the invention the data bus is in communication with a network, such as the Internet, allowing receipt of hardware configuration data from remote networked locations. In further embodiment, the configuration memory may be dual-ported random access memory or electronically erasable programmable read-only memory. In another related embodiment, the controller is in communication with a network, and at least a portion of the hardware configuration is referable from a remote location on the network. In a still further embodiment, the system also has a computer having a central processing unit in communication with the data bus, a graphics display for a user interface, and a process executing on the central processing unit that send user interface data to the display, wherein the reconfigurable logic module performs computations in parallel with the process executing on the central processing unit. The network may be the Internet, the user interface may be an Internet browser, and the browser retrieves the hardware configuration, or a part of such configuration, through the Internet. The system may also include a digital signal processor that includes the controller. The network may utilize the IEEE P1394 protocol.

In a related method according to an employment of the present invention, there are provided the steps of (a) storing hardware configuration in a configuration memory; (b) providing a reconfigurable logic-module in communication with the configuration in the module; (c) establishing the hardware configuration in the reconfigurable logic module; and (d) utilizing the reconfigurable logic module to control an external device in real time. In a further embodiment, step (c) includes providing at least a portion of the hardware configuration to the reconfigurable logic module over a network.

BRIEF DESCRIPTION OF THE DRAWINGS

The foregoing invention will be more readily understood by reference to the following detailed description, taken with the accompanying drawing, in which.

DETAILED DESCRIPTION OF SPECIFIC EMBODIMENTS

Figure 1:
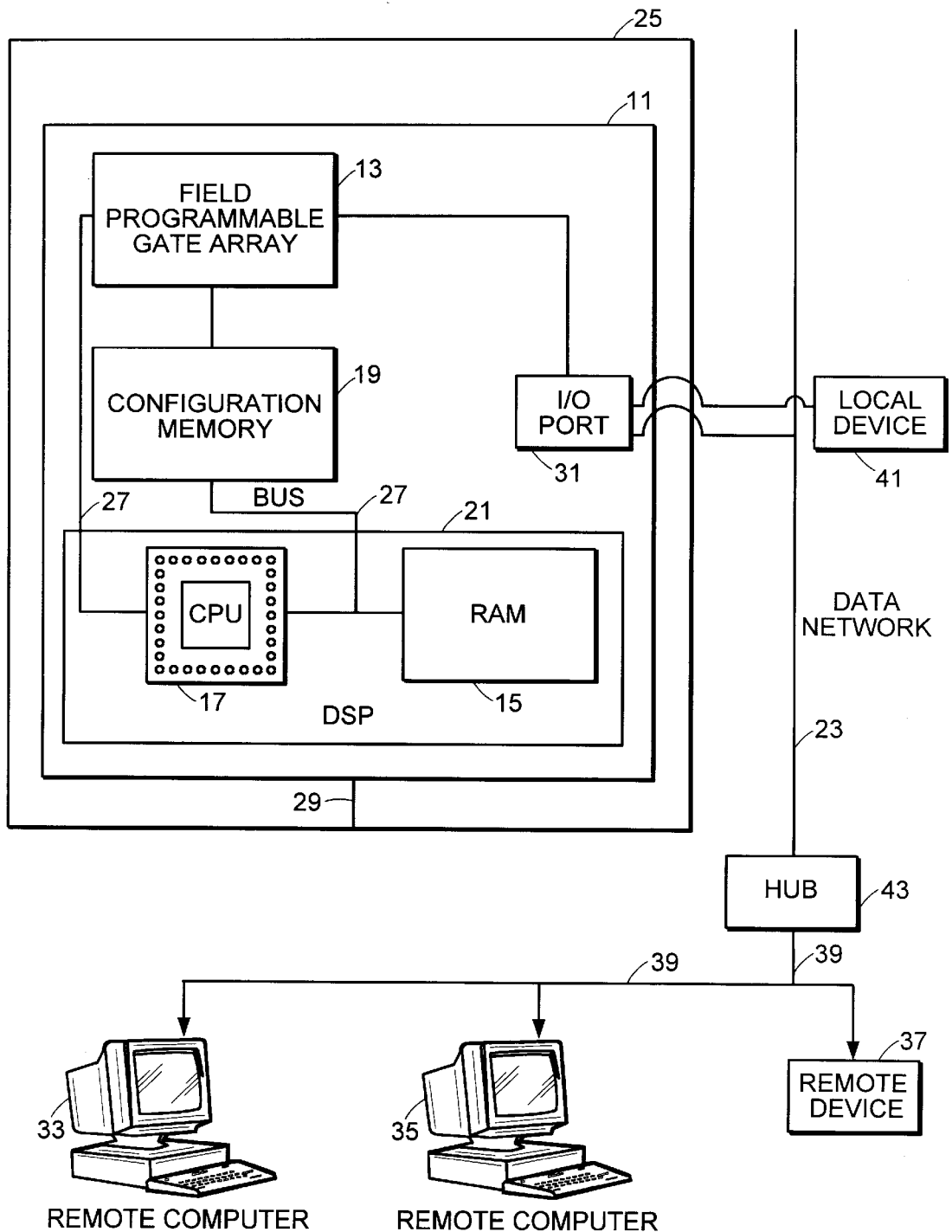
FIG. 1 is a block diagram of a preferred embodiment of the invention.

A preferred embodiment of the invention embraces the Open Modular Architecture for Control specification, through installing the invention within host PC systems, with communications between the invention and the host computer performed through the computer's data bus. To overcome the bandwidth concerns of the prior art systems, the embodiment avoids using the host computer's I/O sub-system, removing from the host's I/O sub-system the strain of supporting a protocol-intensive application as demanding as real-time control. In addition, by avoiding the host computer's I/O sub-system, the embodiment is insulated from interrupts generated by other processes running on the host, interrupts that could interfere with critical real-time control operations. The embodiment utilizes a dedicated I/O port for connecting to a device to be controlled, thus preventing the unpredictable performance inherent in using the host computer's I/O sub-system.

The embodiment also implements an optimized communication protocol adapted to controlling applications under critical hard real-time constraints, allowing for high-precision, high-bandwidth real-time distributed computation and control. High-precision is provided through use of 16 bit analog-to-digital (A/D) and digital-to-analog (D/A) conversion based upon 18-bit calibration, instead of the more common 12-bit to 14-bit A/D-DIA conversion. In a preferred embodiment communication protocol will preferably be implemented over a control network capable of sustaining a data transfer rate of at least 200 Megabits per second (Mbits/sec), to allow for coupling real-time control with transmission of video signals or high-density graphics images.

The embodiments of the invention are designed to allow control of devices located within the host computer, as well as to control devices located upon a distributed network.

FIG. 1 shows the principle components of a reconfigurable hardware system 11 in accordance with a preferred embodiment of the invention. The systems comprise a field programmable gate array (gate array) 13, a random access memory 15, a processor 17, a configuration memory 19, and a dedicated I/O port 31. The processor 17 accesses the configuration memory 19, field programmable gate array 13, the random access memory 15, and the I/O port 31, all over data bus 27. In one embodiment of the invention, the processor 17 and the random access memory 15 may be implemented as a single digital signal processor 21. Alternatively, the processor 17 may be a suitable controller. In preferred embodiments, the system 11 will be installed within a host computer system 25 having a PCI bus 31, and communication with the system will be through a data connection 29 linking the system 11 to the PCI bus. In a preferred embodiment of the invention, the components 11 will be manufactured as part of an expansion card to be plugged directly into a PCI expansion slot within the host computer 25. In the expansion card embodiment, the communication path 29 will be through the edge connectors of the expansion card within the PCI expansion slot.

In practice, the embodiment of FIG. 1 is used to perform real-time control of one or more devices attached to the embodiment. In preferred embodiments, there will be a direct connection between the field programmable gate array 13 and a dedicated I/O port 31. The dedicated I/O port will allow the gate array to control devices 41 directly attached to the invention, as well as to communicate through a data network 23 to control computers 33, 35 or other devices 37 located remotely from the invention. Since in preferred embodiments the gate array has its own dedicated I/O port, the invention will be able to communicate and control devices in a manner independent of and parallel to the operation of the host computer.

In order for real-time control to be feasible, preferred embodiments of the invention will require that for controlling more than a few simple devices, or if controlling devices located far from the invention, that the network 23 be a high-speed network having a data throughput of at least 200 Megabit/sec. In addition, the network should have guaranteed latencies that are sufficiently depending on the application. A suitable network, for example, may be operated in accordance with EEE standard P1394, which is marketed commercially by licensees of Apple Computer Systems of Cupertino Calif., under the FIREWIRE trademark. For a device 41 attached directly to the invention, a low-speed fiber-optic connection may be utilized for communication to the invention. For remote devices and computers, preferred embodiments will have a hub 43 at the remote site for coordinating communication with the invention over the high-speed network 23. For a device 37 or computers 33, 35 attached to the high-speed network 23 via the hub 43, lower speed fiber-optic connections 39 may be utilized. The basic issue for all methods of connecting to the embodiment and thereby to the field programmable gate array 13 is to ensure that there is sufficient bandwidth over the lower speed fiber-optic connections 39 to allow for real-time control of attached devices, as well as sufficient bandwidth over the high-speed network 23 for carrying all of the control data back to the gate array 13.

A simpler preferred embodiment of the invention may be used to control remote devices over low cost plastic optical fiber. When the low cost plastic optical fiber is insufficient to meet the communication needs of the attached devices, or when the distance between the devices and the controlling host computer are too long to allow use of low cost plastic optical fiber, a more sophisticated embodiment of the invention may be used. In this embodiment, a high-speed network link is used to attach the host computer to a hub located at a remote location, from which the low cost plastic optical fiber may then be used to connect to the hub devices that use local to it. In preferred embodiments, hubs may also be daisy-chained via the high-speed communication links, so that devices very distant from the host computer may still be controlled. That is, hubs may be used to connect several distance-limited high-speed links. Embodiments of the present invention may support such topologies and embodiments are designed to allow for controlling devices in a fully distributed environment over wide area networks (WANS).

In preferred embodiments, the state of the field programmable gate array remains constant as long as power is applied to the gate array's circuitry. Therefore, during power-on of the host computer, which preferably supplies power to the embodiment, the embodiment will automatically test and reset the gate array to a known start state. In a preferred embodiment, a specialized software compiler is provided to convert a computer program into instructions suitable for programming the state of the gate array. The programming language may be C, C++ or some other high-level programming language. Through the specialized software, the gate array is programmed to perform a specific hardware function that would otherwise have been executed much more slowly in software. In addition, the gate array may itself be programmed to reprogram itself (in whole or in part) without further intervention depending on conditions experience in the course of control. This selfreprogramming could be due to the gate array's 13 presently loaded hardware configuration, or in response to an action performed by a device under control.

Programming the field programmable gate array 13 is achieved by sending the gate array a configuration signal. In response to this signal, the gate array's internal gates are set according to the contents of the configuration memory 19. After the contents of the configuration memory 19 have been loaded, the gate array 13 now has a new hardware configuration. In a preferred embodiment, there will be little or no interaction between the host computer 25 and the embodiment, and thereby little drain upon the host's resources, except for programming the gate array into a new hardware configuration. In a further embodiment of the invention, there is provided a digital signal processor 21 (DSP) having its own central processing unit 17 and random access memory 15 local to the DSP, so that the DSP can act as a parallel processor for the host computer 25 and coordinate and control the programming of the gate array 13.

In a further embodiment, in addition to receiving hardware configuration data from the configuration memory 19, the field programmable gate array may also retrieve configuration data from remote network locations, such as from remote computers 33, 35, or from remote world wide web sites.

In two preferred embodiments of remote interface modules, the first embodiment has one acquisition and one interface card. The interface card provides the configuration/control support, a digital I/O port, and a low bandwidth optical link interface. The acquisition card provides two 16-bit A/D converters and 16 channels with programmable gains. There are also two additional true differential high-impedance channels; The maximum sampling rate for each channel is 200k samples per second. A second embodiment has the same characteristics as the first model except that an additional card is provided. This additional card provides 16 18-bit D/A channels in voltage mode and two additional channels with voltage or current outputs. A Digital Signal Processing (DSP) card is also available, which provides 40 or 50 MFLOPS (million floating point operations/sec), and several DSP cards can be installed within a hub when distributed computing power is required at the remote sites.

What is claimed is:

1. A dynamically reconfigurable hardware system for real-time control of an external device comprising:
   (a) a configuration memory for storing a hardware configuration;
   (b) a reconfigurable logic module, in communication with the configuration memory, for establishing the hardware configuration in the module on receipt of a configuration signal;
   (c) a controller in communication over a data bus with the reconfigurable logic module and the configuration memory for sending the configuration signal to the reconfigurable logic module independently of the real-time control of the external device and for establishing the dynamically reconfigurable hardware configuration in the configuration memory; and,
   (d) a communication port coupled to the reconfigurable logic module independently of signals on the data bus for controlling the external device.

2. A hardware system as described in claim 1, wherein the configuration memory is dual-ported random access memory.

3. A hardware system according to claim 1, wherein the configuration memory is electrically erasable programmable read only memory.

4. A hardware system according to claim 1, wherein the data bus is in communication with a network.

5. A hardware system according to claim 1, further comprising:
   (e) a network, wherein the controller is in communication a network, and at least a portion of the hardware configuration is retrievable from a remote location on the network.

6. A hardware system according to claim 1, further comprising:
   (e) a computer having a central processing unit in communication with the data bus;
   (f) a graphics display for a user interface; and
   (g) a process executing on the central processing unit that sends user interface data to the display, wherein the reconfigurable logic module performs computations in parallel with the process executing on the central processing unit.

7. A hardware system according to claim 6, wherein the network is the Internet, the user interface is an Internet browser, and wherein the browser retrieves at least a part of the hardware configuration through the Internet.

8. A hardware system according to claim 1, wherein the system further comprises a digital signal processor that includes the controller.

9. A hardware system according to claim 4, wherein the network utilizes the IEEE P1394 protocol.

10. A method for controlling an external device in real time, the method comprising:
    (a) receiving a configuration signal over a data bus;
    (b) storing a hardware configuration in a configuration memory based at least on the configuration signal;
    (c) providing a dynamically reconfigurable logic module in communication with the configuration memory for establishing the hardware configuration in the module;
    (d) establishing the hardware configuration in the reconfigurable logic module; and
    (e) utilizing the reconfigurable logic module to control the external device in real time independently of signals on the data bus.

11. A method according to claim 10, wherein step (e) includes providing at least a portion of the hardware configuration to the reconfigurable logic module over a network.

* * * * *

EX PARTE REEXAMINATION CERTIFICATE (9324th)

United States Patent
Martel et al.

(10) Number: US 5,887,165 C1
(45) Certificate Issued: Oct. 3, 2012

(54) DYNAMICALLY RECONFIGURABLE HARDWARE SYSTEM FOR REAL-TIME CONTROL OF PROCESSES

(75) Inventors: Sylvain Martel, Lincoln, MA (US); Serge R. Lafontaine, Lincoln, MA (US); Ian W. Hunter, Lincoln, MA (US)

(73) Assignee: Latrosse Technologies, L.L.C., Wilmington, DE (US)

Reexamination Request:
No. 90/011,512, Feb. 25, 2011

Reexamination Certificate for:
Patent No.: 5,887,165
Issued: Mar. 23, 1999
Appl. No.: 08/879,923
Filed: Jun. 20, 1997

Related U.S. Application Data

(60) Provisional application No. 60/020,249, filed on Jun. 21, 1996.

(51) Int. Cl.
*G06F 15/76* (2006.01)
*G06F 15/78* (2006.01)
*G06F 9/38* (2006.01)

(52) U.S. Cl. .................. 713/1; 713/2; 713/100; 710/10; 712/10; 712/E9.067; 709/221

(58) Field of Classification Search ........................ None
See application file for complete search history.

(56) References Cited

To view the complete listing of prior art documents cited during the proceeding for Reexamination Control Number 90/011,512, please refer to the USPTO's public Patent Application Information Retrieval (PAIR) system under the Display References tab.

*Primary Examiner* — Mark Sager

(57) ABSTRACT

A dynamically reconfigurable hardware system for real-time control of an external device. Configuration of a dynamically reconfigurable logic module is provided on the basis of a hardware configuration established in a local configuration memory by a configuration signal received over a data bus from a host processor, thereby enabling an external device to be controlled in real-time independently of the host processor.

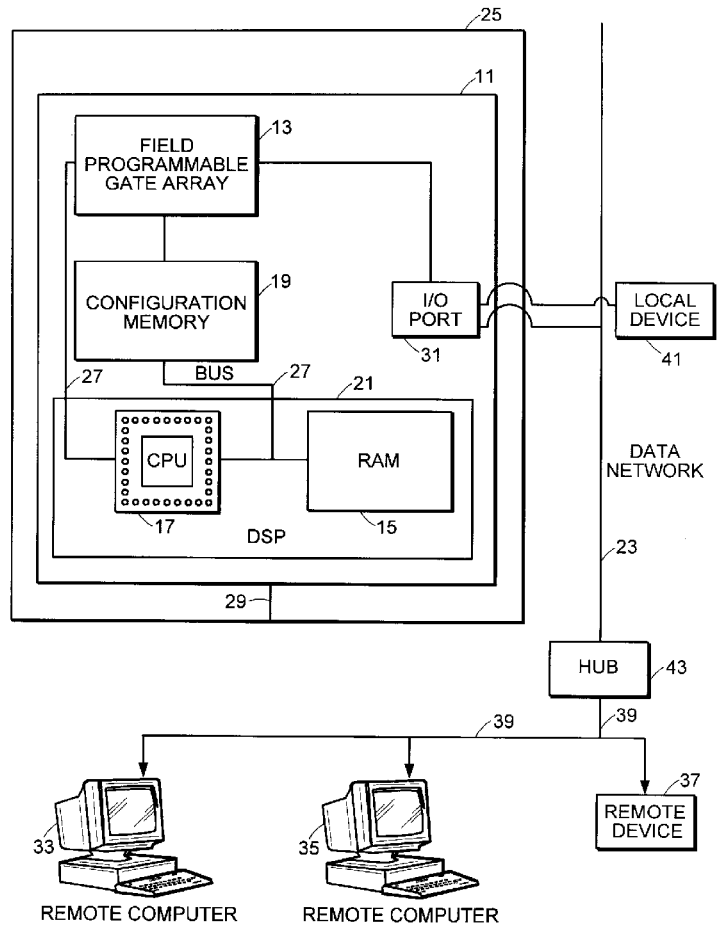

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 5, 7 and 10 are determined to be patentable as amended.

Claims 2-4, 6, 8-9 and 11, dependent on an amended claim, are determined to be patentable.

New claims 12-30 are added and determined to be patentable.

1. A dynamically reconfigurable hardware system for real-time control of an external device comprising:
   (a) a configuration memory for storing a *dynamically reconfigurable* hardware configuration;
   (b) a reconfigurable logic module, in communication with the configuration memory, for establishing the *dynamically reconfigurable* hardware configuration in the module on receipt of a configuration signal;
   (c) a controller in communication over a data bus with the reconfigurable logic module and the configuration memory for sending the configuration signal to the reconfigurable logic module independently of the real-time control of the external device and for establishing the dynamically reconfigurable hardware configuration in the configuration memory; and,
   (d) a communication port coupled to the reconfigurable logic module independently of signals on the data bus for controlling the external device.

5. A hardware system according to claim 1, further comprising:
   (e) a network, wherein the controller is in communication [a] *with the* network, and at least a portion of the *dynamically reconfigurable* hardware configuration is retrievable from a remote location on the network.

7. A hardware system according to claim 6, wherein *the controller is in communication with a network, wherein* the network is the Internet, the user interface is an Internet browser, and wherein the browser retrieves at least a part of the *dynamically reconfigurable* hardware configuration through the Internet.

10. A method for controlling an external device in real time, the method comprising:
    (a) receiving a configuration signal over a data bus;
    (b) storing a hardware configuration in a configuration memory based at least on the configuration signal;
    (c) providing a dynamically reconfigurable logic module in communication with the configuration memory for establishing the hardware configuration in the module;
    (d) establishing the hardware configuration in the *dynamically* reconfigurable logic module; and
    (e) utilizing the *dynamically* reconfigurable logic module to control the external device in real time independently of signals on the data bus, *wherein the received configuration signal is sent independently of real-time control of the external device.*

12. *A method according to claim 11, wherein the network is the Internet.*

13. *A method according to claim 11, wherein the data bus is in communication with the network.*

14. *A method according to claim 11, wherein the network utilizes an IEEE P1394 protocol.*

15. *A method according to claim 10, wherein the reconfigurable logic module is a field programmable gate array (FPGA).*

16. *A method according to claim 10, wherein the reconfigurable logic module is a system programmable gate array (SPGA).*

17. *A method according to claim 10, wherein the configuration memory is dual-ported random, access memory.*

18. *A method according to claim 10, wherein the configuration memory is electrically erasable programmable read only memory.*

19. *A hardware system according to claim 1, wherein the reconfigurable logic module is a field programmable gate array (FPGA).*

20. *A hardware system according to claim 1, wherein the reconfigurable logic module is a system programmable gate array (SPGA).*

21. *A hardware system according to claim 1, wherein the hardware system is implemented as an expansion card configured to be plugged into a Peripheral Component Interconnect (PCI) expansion slot.*

22. *A hardware system according to claim 1, wherein the communication port is directly connected to the reconfigurable logic module.*

23. *A hardware system according to claim 5, wherein the network is a high-speed network having a data throughput of at least 200 Mb/s.*

24. *A hardware system according to claim 5, wherein the network includes at least one hub for communication with remote devices.*

25. *A hardware system according to claim 24, wherein the network includes fiber optic connections between the hub and the remote devices.*

26. *A hardware system according to claim 24, wherein the network include a plurality of hubs connected in a daisy-chain topology.*

27. *A hardware system according to claim 1, wherein the real-time control of the external device is provided through a 16 bit analog-to-digital (A/D) and digital-to-analog (D/A) conversion.*

28. *A hardware system according to claim 27, wherein the 16 bit analog-to-digital (A/D) and digital-to-analog (D/A) conversion is based upon 18-bit calibration.*

29. *A hardware system according to claim 6, wherein the external device is located within the computer.*

30. *A hardware system according to claim 6, wherein the external device is located outside of the computer upon a network.*

\* \* \* \* \*